United States Patent [19]

Moris

[11] 4,367,850
[45] Jan. 11, 1983

[54] ENDLESS LOOP TAPE CARTRIDGE

[75] Inventor: Alfred H. Moris, St. Paul, Minn.

[73] Assignee: Minnesota Mining and Manufacturing Co., St. Paul, Minn.

[21] Appl. No.: 214,042

[22] Filed: Dec. 8, 1980

[51] Int. Cl.³ .......................................... G11B 23/06
[52] U.S. Cl. .............................. 242/55.19 A; 360/93
[58] Field of Search ................ 242/55.19 A, 55.19 R, 242/118.32, 118.3; 360/93; 352/72, 78, 128

[56] References Cited
U.S. PATENT DOCUMENTS

| | | | |
|---|---|---|---|
| 2,967,026 | 1/1961 | Deventer | 242/118.32 |
| 3,235,195 | 2/1966 | Hebb et al. | 242/55.19 A |
| 3,257,084 | 6/1966 | Cole, Jr. | 242/55.19 A |
| 3,524,602 | 8/1970 | Greene | 242/55.19 A |
| 3,550,872 | 12/1970 | Porterfield | 242/55.19 A |
| 3,773,272 | 11/1973 | Wallace | 242/55.19 A |
| 3,913,857 | 10/1975 | Threlkeld | 242/55.19 A |
| 3,917,186 | 11/1975 | Solomon | 242/55.19 A |
| 3,945,582 | 3/1976 | Yagi et al. | 242/55.19 A |
| 3,966,134 | 6/1976 | Matsuda | 242/55.19 A |
| 3,967,788 | 7/1976 | Ponce | 242/55.19 A |
| 4,013,239 | 3/1977 | Beswick et al. | 242/55.19 A |
| 4,054,925 | 10/1977 | Towner et al. | 242/55.19 A |
| 4,257,075 | 3/1981 | Wysocki et al. | 242/55.19 A |

FOREIGN PATENT DOCUMENTS 775642  3/1957  United Kingdom .
2001931 2/1979  United Kingdom ........ 242/55.19 A Primary Examiner—Billy S. Taylor
Attorney, Agent, or Firm—Cruzan Alexander; Donald M. Sell; William L. Huebsch

[57] ABSTRACT

A cartridge including a cylindrical hub fixed on a housing, which hub has a central opening and a slot extending axially across the full width of the hub and communicating with the central opening, and an endless length of magnetic tape having a major portion wrapped about the hub to form a coil and a minor portion extending from the innermost wrap of the coil, through the slot and around the side surface of the coil to the outermost wrap of the coil. Means on the housing define a tape path for the minor tape portion at the access openings which afford engagement of the tape by the heads and drive mechanism of a playback machine, and a spring biased moveable guide pin guides the minor tape portion between the access openings and the outermost wrap of the coil, and provides a low tension in the outermost wrap of the coil which in turn produces a relatively high generally unifrom tension in the tape crossing the tape heads to hold it in engagement therewith without the use of pressure pads.

7 Claims, 3 Drawing Figures

ENDLESS LOOP TAPE CARTRIDGE

TECHNICAL FIELD

The present invention relates to cartridges for magnetic recording and/or playback machines, which cartridges include lengths of magnetizable tape which are spliced into an endless loop; and in one important aspect to such cartridges used in the radio broadcasting industry.

BACKGROUND ART

Generally such cartridges include means for supporting the endless loop of tape for travel along a path past one or more access openings defined in the cartridge at which access openings the tape may be engaged by means in a machine to drive it along the path past transducers on the machine also received in the access openings.

Such a cartridge of a type commonly used for radio broadcasting and which can be made to conform to the "Standard" copyrighted in 1976 of the "National Association of Broadcasting" (called NAB herein) for "cartridge tape" is described in U.S. Pat. No. 3,350,025. Cartridges generally of the type described in that patent include a rotatable hub about which a major portion of the tape is coiled, and guides for guiding a minor portion of the tape from the innermost wrap of the coil around one edge surface of the coil, past access openings defined on the cartridge, and then to the outermost wrap of the coil. A tape drive mechanism in a recording and/or playback machine can engage the tape at one of the access openings to pull it from the innermost wrap of the coil past transducers or record and playback heads on the machine received in other of the access openings. The guides in this type of cartridge provide most of the guiding for movement of the tape along a path past the heads on the machine in which the cartridge is mounted. Thus if the cartridge is misaligned with the machine, the tape can be driven along a slightly inaccurate path past the heads, resulting in a phase error in the signal produced by the machine. The tension in the tape varies greatly as the splice for the tape (which splice is adhered to one surface of ends of the tape and has a thickness about equal to that of the tape) moves through the coil from its outermost wrap to its innermost wrap, or as relatively thick portions of the tape (which thick portions are caused by normal minute variations in backing thickness and/or coating weights of oxides or graphite along the tape) move into and out of radial alignment in the coil as the wraps of tape in the coil move relative to each other. Such changes in tension may produce flutter and affect tracking of the tape. Also, in such a cartridge the tape is twisted and pulled from the coil around the side surface of the coil while it is under tension from the tape drive mechanism, which tends to wear the tape at a rapid rate, particularly along its edges, thereby reducing the useful life of the tape in the cartridge.

U.S. Pat. No. 4,268,877 describes an improved cartridge and a method for driving an endless length of magnetizable tape in the improved cartridge past a transducer which will produce a phase error, wow and flutter comparable to that produced by professional reel-to-reel magnetic tape recorders, and which causes significantly less wear on the tape in the cartridge than is caused on the tape in the type of prior art cartridge described above.

The improved cartridge described in U.S. Pat. No. 4,268,877 includes an endless length or loop of tape having a major portion of its length wrapped in a coil around a fixed hub having a central opening. A minor portion of the tape extends from the innermost wrap of the coil through a slot in the hub into the central opening and then around a side surface of the coil to its outermost wrap. If a transducer is positioned in the central opening, and tape is pulled through the slot from the innermost wrap of the coil with the edges of the tape generally coplanar with the edges of the innermost wrap while the tape is guided across the transducer by guides fixed and precisely oriented with respect to the transducer, the phase error of the resultant signal will be very small, especially since the coil will shift axially to provide the best possible alignment between the coil and the guides. Also the surface of the hub supporting the innermost wrap of the coil is defined by annular axially spaced ribs. Such ribs significantly reduce the tension in tape being pulled through the slot as compared to the use of a fixed non-ribbed hub to support the coil by reducing friction between the innermost wrap of the coil and the fixed hub and between adjacent wraps of tape in the coil which move relative to each other as the coil rotates about the hub. Machines which accept such cartridges, however, must have a structure for receiving the magazine with a transducer, guides and a drive mechanism in the central opening of the hub, which structure is substantially different than that of machines presently commonly in use in broadcast studios that utilize cartridges conforming to the "cartridge tape" standards set forth by the NAB. Thus, to use such cartridges it would be necessary for broadcast studios to install new record/playback machines which would be expensive, and would not accept cartridges that do conform to the standards of the NAB which the studio may already have recorded.

DISCLOSURE OF THE INVENTION

The present invention provides a cartridge including a length of magnetic tape spliced into an endless loop, which cartridge in one embodiment can be made to conform to the standard of the NAB so that it can be used in the types of record/playback machines presently in use in the broadcast industry, and which cartridge embodiment, while slightly less effective in reducing phase error than the cartridge described in U.S. Pat. No. 4,268,877, causes much less edge wear on the tape and much less change in tension in the tape at a head of a machine in which the cartridge is received than the types of cartridges presently in use in the broadcast industry which conform to the standard of the NAB.

Also, the present invention provides a method by which in the broadcast cartridge described above or other types of cartridges the tension in the tape at a head of a machine in which the cartridge is engaged can be maintained at a relatively high, generally uniform value so that the tape can be pressed against the head via the tension alone without the use of pressure pads (which pressure pads when used are sources of flutter, tape wear, and misguiding of the tape).

The method according to the present invention for providing such high, generally uniform tension comprises providing a fixed generally cylindrical hub having a central opening and a slot extending axially across the full width of the hub and communicating with its central opening, and an endless length of strip material or magnetic tape; wrapping a major portion of the tape about the hub to form a coil while allowing a minor portion of the tape to extend from the innermost wrap of the coil through the slot into the central opening of the hub, and around the side surface of the coil to the outermost wrap of the coil; pulling the tape from the slot and across a head on a record/playback machine; and applying a light force to tension the minor portion of the tape as it moves onto the outer wrap of the coil which will produce the high generally uniform tension in the minor portion of the tape being pulled from the coil and across the head.

The embodiment of the cartridge according to the present invention adapted for use in the broadcast industry which employs that method to tension tape across a head comprises a housing adapted to be received in a record/playback machine and having access openings adapted to receive record/playback heads and a tape drive mechanism in the machine. A generally cylindrical hub is fixed on the housing at a position spaced from the access openings, which hub has a central opening and a slot extending axially across the full width of the hub and communicating with its central opening. An endless length of strip material or magnetic tape has a major portion wrapped about the hub to form a coil and a minor portion extending from the innermost wrap of the coil through the slot into the central opening of the hub, and around the side surface of the coil to the outermost wrap of the coil. Means on the housing define a tape path for, and producing tension in, the minor portion of the tape. The means for defining a tape path for, and producing tension in, the minor portion of the tape comprise means for guiding the minor portion of the tape past the access openings in a predetermined position for engagement by the heads and the drive mechanism of the playback machine, a guide pin guiding the minor portion of the tape between the access openings and the outermost wrap of the coil, means mounting the guide pin for movement between a first position providing a first path length between the access openings and the outer wrap of the coil and a second position providing a second path length longer than the first path length between the access openings and the outer wrap of the coil (which means preferably is an arm having a first end supporting the guide pin, and a second end pivotably mounted on the housing to afford movement of the pin along an arcuate path adjacent the periphery of the coil between its first and second positions), and means for biasing the guide pin toward its second position.

The pin can move to positions between its first and second positions under the influence of the biasing means to accommodate changes in length of the minor portion of the tape which decreases or increases respectively when the length of the major portion increases or decreases. The major portion of the tape cyclically undergoes its largest change in length by slowly decreasing in length as the splice moves from the coil's outer wrap toward its inner wrap and by then suddenly increasing in length as the splice leaves the coil. The means for biasing the guide pin is adapted to apply a small force at the guide pin (e.g., generally in the range of 2 to 14 grams) to lightly tension the tape extending around the pin and moving onto the outermost wrap of the coil, somewhat in the manner of a rope or Proney brake, which light tension produces a significantly higher tension (e.g. generally in the range of 50 to 115 grams or 2 to 4 ounces) in tape leaving the coil. That higher tension is suprisingly uniform (e.g. plus or minus 7 grams or ¼ ounce) despite small changes in the force applied by the guide pin (e.g., plus or minus 1½ grams) as the length of the minor portion of the tape changes due to the position of the splice along the tape.

The tape is guided so that the quite uniform higher tension thus produced in the minor portion of the tape between the inner wrap of the coil and the drive mechanism of a machine in which the cartridge is engaged presses the tape against the record and playback heads of the machine with sufficient pressure that pressure pads (commonly used in prior art cartridges to press the tape against the heads) are not required, and the tape is thus not subjected to the abrasion and erratic forces caused by sliding contact between the tape and such pressure pads.

Also, the combination of the higher tension in the minor portion of the lower tape between the coil and the drive mechanism and the tension between the drive mechanisms and the outer wrap of the coil prevents loose tape wraps in the coil, thereby restricting wrapping of the tape around the drive capstan. Such wrapping, if it occurs, can damage the tape and/or jam the machine. Such wrapping of tape around the drive capstan occasionally occurs in prior art cartridges due to the inertia of the rotating hub which can push a loop of tape into the area around the drive capstan of a machine when the machine is stopped. Subsequently, when the machine again starts, that loop can wrap around the capstan, or can be engaged and damaged by other moving portions of the mechanism in the machine.

Additionally, there are advantages in the use of the slotted fixed ribbed hub which allows tape to be pulled from the innermost wrap of the coil into the central opening of the hub through the slot with the edges of the tape pulled into the central opening at least generally in the same plane as the edges of the tape in the coil; rather than the use of a rotary hub in which the tape must be pulled from the innermost wrap around a side surface of the coil. Edge damage to the tape is reduced. Also, the tape does not require the heavy graphite coatings that are used in some prior art cartridges to facilitate removal of the inner wrap of the coil, which graphite coatings, when used, can result in graphite debris in the cartridge that can interfere with recording and/or reading information on the tape.

BRIEF DESCRIPTION OF THE DRAWING

The invention will be further described with reference to the accompanying drawing wherein like numbers refer to like parts in the several views, and wherein.

DETAILED DESCRIPTION

Figure 1:
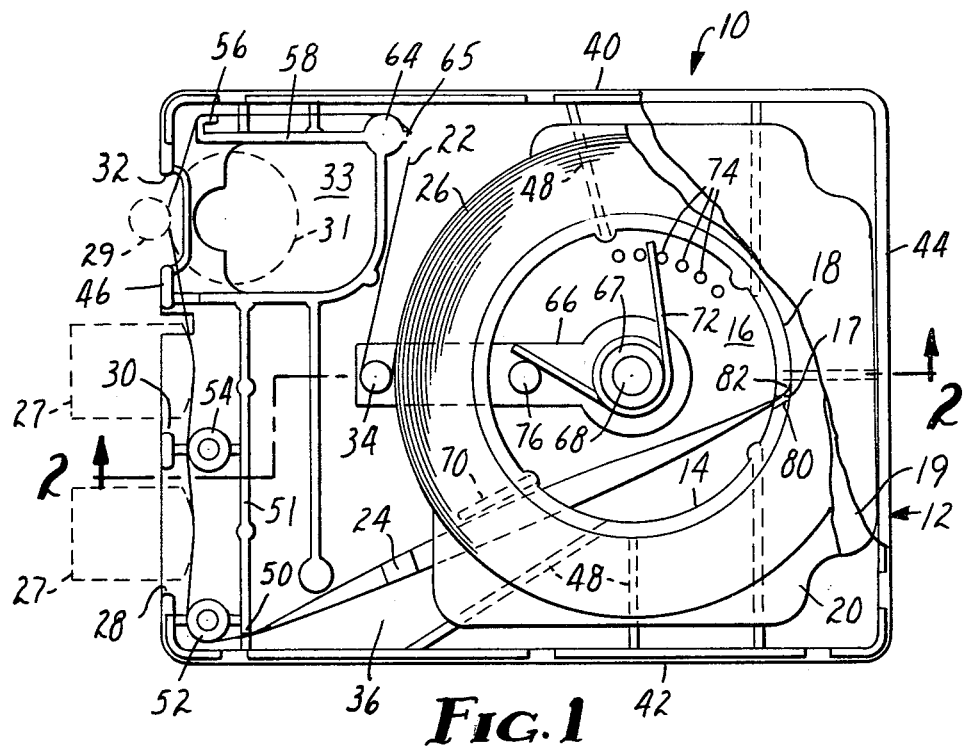
FIG. 1 is a horizontal plan view of a tape cartridge according to the present invention having parts broken away to show datails.
Figure 2:
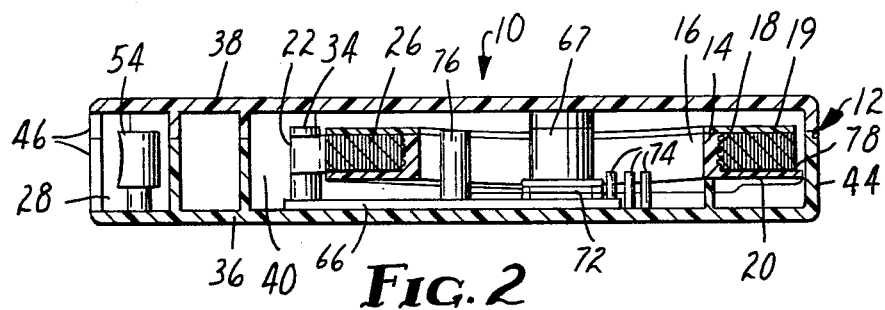
FIG. 2 is a sectional view taken approximately along line 2—2 of FIG. 1.

Referring now to the drawing, there is shown a tape magazine or cartridge according to the present invention generally designated by the numeral 10. The cartridge 10 includes a two-piece molded housing 12, an annular hub 14 fixed in the housing 12, which hub 14 has a central opening 16 and a slot 17 communicating between the central opening 16 and a peripheral surface of the hub 14 defined by annular axially spaced ribs 18, and upper and lower opposed flanges 19 and 20 extending radially outwardly from the edges of the hub 14.

A length of strip material or magnetizable tape 22 is spliced into an endless loop by a splice 24. The tape loop has a major portion wound in a coil 26 about the hub 14 between the flanges 19 and 20, and a minor portion extending from the innermost wrap of the coil 26 through the slot 17, and along means for defining a tape path for the minor portion of the tape past access openings 28, 30, 32, and 33 in the cartridge housing 12 (which access openings 28, 30, 32 and 33 are adapted to receive heads 27, and a capstan 29 and a pinch roller 31 of a drive mechanism (shown in dotted outline in FIG. 1) for a tape record/broadcast machine (not shown) to the outermost wrap of the coil 26, around a movable guide pin 34 also included in means for producing tension in the minor portion of the tape 22 as it is moved through the cartridge 10, as will later be explained.

The two-piece housing 12 is generally rectangular and comprises a bottom wall 36 in which the access opening 33 is formed, a top wall 38 which is preferably transparent so that the movement of the tape 22 within the housing 12 may be observed, opposite side walls 40 and 42, a rear wall 44 and a front wall 46 in which the access openings 28, 30 and 32 are formed. The outer shape of the housing 12, the positioning and shape of the access openings 28, 30, 32 and 33 for the heads 27, the capstan 29 and the pinch roller 31 of a drive mechanism, and the location of the tape path past the openings 28, 30, 32 and 33 are all in accordance with the "NAB Standard, Cartridge Tape Recording and Reproducing" which is published by the National Association of Broadcasters, 1771 N Street N.W., Washington, D.C. 20036, the content whereof is incorporated herein by reference.

The means for defining the tape path for the tape 22 past the access openings 28, 30, 32 and 33 comprises bosses 48 projecting from the inner surface of the bottom wall 36, which bosses 48 fixedly support the hub 14 and flanges 19 and 20 and space the lower flange 20 from the bottom wall 36 so that tape 22 exiting from the slot 17 will twist about 90 degrees as it passes across the opening 16, and pass with one of its major surfaces against the outer surface of the lower flange 20 between the lower flange 20 and the bottom wall 36, and then twist back to its original orientation and pass around a radiused edge 50 on a wall 51 projecting normal to the bottom wall 36 so that the tape 22 then moves along a minor path portion generally parallel to and along the side wall 42. Also included is a generally cylindrical guide 52 fixed on and projecting from the bottom wall 36 and having concave side surfaces facing the side and front walls 42 and 46, around which guide 52 the tape changes direction to then move parallel to the front wall 46 and across the openings 28, 30 and 32. A second generally cylindrical guide 54 fixed on and projecting from the bottom wall 36 also has a concave surface facing the front wall 46 and with the guide 52 serves to position the tape at a predetermined position axially along the guides 52 and 54 between the top and bottom walls 38 and 36 and with respect to the openings 28, 30 and 32 (and thereby along heads 27 positioned in the openings 28 and 30) by centering the tape across their concave side surfaces, which centering effect is known in the art. An upstanding arcuate wall 56 guides the tape through a 90-degree arc, along the side wall 40 in a channel between the side wall 40 and a portion 58 of an adjacent wall which surrounds the access opening 33 in the bottom wall 36 and to a cylindrical post 64 and wall edge surface 65 at the end of the wall portion 58 opposite the front wall 46. From the wall edge surface 65 the tape extends around the movable guide pin 34 included in the means for providing tension in the minor portion of the tape 22.

The means for maintaining tension in the minor portion of the tape 22 comprises the movable guide pin 34, and means mounting the guide pin 34 for movement provided by an arm 66 having one end on which the guide pin 34 is fixed, and an opposite end having a hollow cylindrical projecting collar 67 journaled about a cylindrical projection 68 from the bottom wall 36 located approximately co-axially with the the hub 14. Pivotal movement of the arm 66 allows the guide pin 34 to move along the periphery of the coil 26 between (1) a first position providing a first path length between the access openings 28, 30, 32 and 33 and the periphery of the coil 26, (which first position is defined by engagement of the arm 66 against one of the bosses 48 adjacent the side wall 40); and (2) a second position providing a second path length longer than the first path length between the access openings 28, 30, 32 and 33 and the coil 26 defined by engagement of the guide pin 34 with one of the bosses 48 adjacent the side wall 42. A spring 72 is coiled about 5 times around the collar 67 and has a first end supported against one lug in an arcuate row of lugs 74 projecting from the bottom wall 36, and an opposite second end engaged against a lug 76 on the arm 66 to provide adjustable means for biasing the movable guide pin 34 towards its second position. The spring 72 is long so that it provides a low force (e.g. in the range of about 2 to 14 grams measured at the pin 34) to press the guide pin 34 against the tape 22 over the relatively small range of movement of the guide pin 34, and the selection of different lugs from the row of lugs 74 allows some adjustment to be made in that force level by engaging the first end of the spring 72 with a selected one of the lugs 74.

Figure 3:
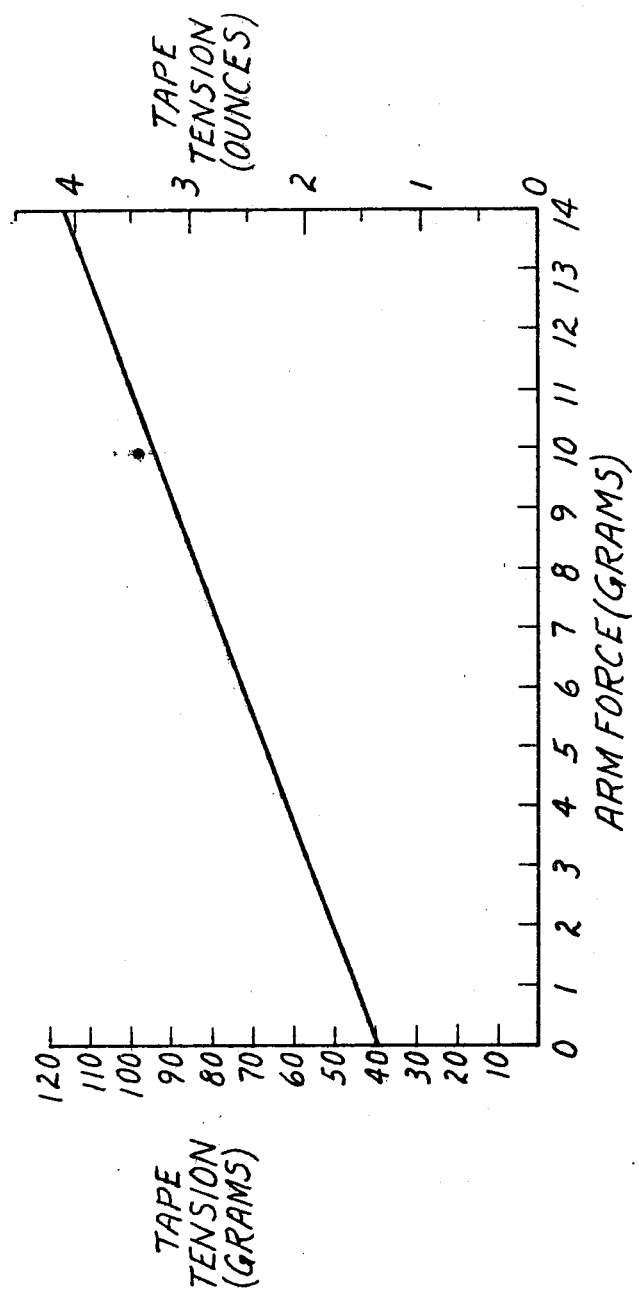
FIG. 3 is a graph relating different forces that can be applied to tape at the outermost wrap of a coil through a guide pin on a pivot arm in the cartridge with the tension in the tape being pulled from the innermost wrap of the coil.

As an example, FIG. 3 is a graph showing the relationship between the force applied at the guide pin 34 (which is labeled "ARM FORCE" and is indicated along the horizontal side of the graph) and the resultant tension in the tape 22 being pulled from the innermost wrap of the coil 26 (which is labeled "TAPE TENSION" and is indicated along the vertical side of the graph) when the hub 14 has a diameter of about 5.72 cm (2.25 in.) and the tape 22 loop is about 86 meters (281 ft.) long, 0.635 cm. (0.25 in.) wide and is of the type commercially designated "Scotch Brand No. 158" available from Minnesota Mining and Manufacturing Company of St. Paul, Minn. The "TAPE TENSION" data for the forces applied at the guide pin 34 of below 2 grams is approximate, since, particularly where no force is applied at the guide pin 34, the effect of the splice moving from the outer wrap toward the inner wrap of the coil 26 or other restrictive forces in the coil 26 will cause significant changes and irregularities in the tension in the tape being pulled from the innermost wrap of the coil 26.

Preferably the hub 14 is of polymeric material (e.g., the acetal sold under the trade designation "Celcon" by Celanese Corporation of America, New York, N.Y.)

which has been annealed (e.g., for 15 minutes at 180° F.) so that it will achieve the dimension that it would otherwise subsequently achieve during its running cycle if exposed to temperatures up to the annealing temperature. Thus such subsequent annealing of the hub will not cause a substantial change in length in the minor portion of the tape 22 extending around the guide pin 34 which, if it occurred, would change the range of forces applied at the guide pin 34 via the spring 72.

Also, preferably the material from which the hub 14 is molded is filled with material that will modify its coefficient of thermal expansion so that during the substantial temperature increases that can occur during the operation of the cartridge 10 (e.g., over 35 degrees Fahrenheit) the increase in the length of the tape 22 caused by such temperature rise will be offset by the greater length of the tape 10 in the coil 26 due to the increase in thickness of the tape 22 and the increased diameter of the hub 14 so that there will be no substantial change in the length of the minor portion of the tape 22 extending between the inner and outer wraps of the coil 26 past the access openings 28, 30 and 32 and around the guide pin 34. As an example, about 15% fibrous glass fill in 5.72 cm. diameter hubs 14 of the polymer "Celcon" have been found to produce such results when used with 86 meters of the "Scotch Brand No. 158" tape 22 mentioned above.

With hubs 14 of the material and size described above carrying 86 meters of the "Scotch Brand No. 158" tape 22 it is preferred to initially set the force at the guide pin 34 at about 5 grams with the guide pin 34 initially positioned slightly closer to the wall 40 than shown in FIG. 1 and with the splice 24 in or close to the outermost wrap on the coil 26. Upon initial running, the force at the guide pin 34 will increase to about 7 grams as the splice 24 moves through the innermost wrap of the coil 26. As the tape 22 is run through the cartridge 10, wear on the tape 22 will increase the length of the minor portion of the tape 22 extending around the guide pin 34 so that after substantial use of the cartridge 10, the force at the guide pin 34 may cycle between about 3 and 5 grams, but will still produce the desired relatively high and generally uniform tension in tape 22 being pulled past the heads 27 as is seen in FIG. 3. When shorter lengths of the same tape 22 are used on the same hub 14, (e.g. 61 instead of 86 meters) FIG. 3 is not applicable, and the initial force applied at the guide pin 34 must be higher (e.g. 7 instead of 5 grams) to produce a similar tension in the tape 22 being pulled from the innermost wrap of the coil 26.

As is taught in U.S. Pat. No. 4,268,877, the ribs 18 restrict the force required to pull the tape 22 from the innermost wrap of the coil 26 by not only reducing friction between the fixed hub 14 and the innermost wrap on the coil 26, but also reducing friction between all the wraps of the coil 26 which must slide relative to each other as the coil 26 rotates. Also, the radius of the generally cylindrical hub 14 at its periphery defined by the ribs 18 preferably decreases slightly (e.g., by about 0.05 cm for a hub 14 with about a 2.7 cm average radius) around the hub 14 in the direction the coil 26 rotates from an edge 80 of the slot to a radiused edge 82 of the slot over which the inner wrap of tape bends as it exits the coil 26, which decreasing radius surprisingly decreases surging in the tension caused by the wraps of the tape in the coil 26 moving relative to each other.

A graphite lubricated polymeric sheet 78, which may be made from the same material as the tape 22, is positioned between the lower flange 20 and the lower side surface of the coil 26. This sheet 78 restricts cinching of the wraps of the tape 22 in the coil 26 about the hub 14 during rapid acceleration of the coil 26, apparently by providing a measure of tracking engagement with the edges of the wraps of tape in the coil to retain their original diameter during such acceleration.

During use of the cartridge 10 on a record/broadcast machine the capstan 29 and pinch roller 31 pull tape through the slot 17 in the hub 14 from the innermost wrap of the coil 26, which causes the coil's innermost wrap to move along the annular ribs 18 defining the surface of the hub 14. From the slot 17, the tape moves across the central opening 16 of the hub where it longitudinally twists about 90 degrees and then passes along the outer surface of the bottom flange 20 through a channel between the bottom flange 20 and the bottom wall 36. The tape then twists back to the same orientation it had at the slot 17 as it moves between the flange 20 and the radiused edge 50 around which the tape changes direction and moves onto the surface of the guide 52. The tape moves about 90 degrees around the surface of the guide 52 and across the side surface of the guide 54 to the capstan 29, so that the concave guide surfaces of the guides 52 and 54 center the tape 22 across the concavities on their surfaces to transversely position the tape 22 in a predetermined location between the top and bottom walls 36 and 38 of the cartridge so that it will be properly located with respect to heads 27 in the access openings 28 and 30. Tape leaving the nip between the capstan 29 and the pinch roller 31 moves in a generally U-shaped pattern around the arcuate wall 56 and post 64 onto the movable pin 34 about which the tape passes about 180 degrees and moves onto the coil 26 as its outermost wrap. The spring 72 biases the movable pin to maintain a low tension in the length of tape 22 extending from the capstan 29 and around the coil 26 as its outermost wrap, which low tension results in a quite uniform higher tension in the tape leaving the slot 17 and extending from the slot 17 past the heads to the capstan 29. As the splice 24 between ends of the tape 22 (which splice 24 is about as thick as the tape 22 itself) moves through the coil 26 from its outermost to its innermost wrap, the length of the major portion of the tape 22 in the coil 26 will increase slightly due to the increased diameter of each wrap in the coil 26 overlaying the splice 24. Such increase in length of the major portion of the tape 22 in the coil 26 will decrease the length of the minor portion of the tape along the path past the access openings 28, 30, 32 and 33 between the innermost and outermost wraps of the coil 26, which decrease will be accommodated for by movement of the arm 66 and pin 34 toward its first position against the bias of the spring 72. Movement of the arm 66 and pin 34 under the influence of the spring 72 will also maintain tension in the minor portion of the tape as its length decreases as the splice 24 moves through the coil 26 and then increases suddenly as the splice 24 leaves the innermost wrap of the coil 26, or as relatively thick portions of the tape 22 (which are caused by normal minute variations in coating weights along the tape 22 and minute thickness variations in the backing of the tape 22) move into and out of radial alignment in the coil 26 as the wraps of tape in the coil move relative to each other. During such movement of the arm 66 the force applied by the spring 72 to that tape will change only slightly (e.g. about 3 grams) due to the long length of the spring 72, and the effect of the changes in tension in the outermost wrap of tape on the coil 26 caused by such change in bias on the arm 66 on the tension in the tape 22 at the innermost wrap of the coil 26 will be somewhat offset by the decrease in length of the outermost wrap of tape 22; all of which results in a higher tension of surprisingly uniformity in the tape 22 exiting the slot 17 for any position of the splice within the coil 26 (e.g., plus or minus about 7 grams or ¼ ounce).

I claim:

1. A cartridge comprising:
   a housing adapted to be received in a machine and having access openings adapted to receive heads and a tape drive mechanism in said machine;
   a hub fixed on said housing at a position spaced from said access openings, said hub having a generally cylindrical peripheral surface fixed with respect to said housing, a central opening, and a slot extending axially across the full width of the hub opening through said peripheral surface and communicating with said central opening;
   an endless length of magnetic tape having a major portion wrapped about said peripheral surface to form a coil and a minor portion extending from the innermost wrap of the coil through said slot into said central opening, and around the side surface of the coil to the outermost wrap of the coil; and
   means on said housing for defining a tape path for and producing tension in said minor portion, comprising means for guiding said minor portion in a free path past said access openings in a predetermined position for engagement by the heads and drive mechanism of the machine, a guide pin guiding said minor portion between said access openings and the outermost wrap of said coil, means mounting said guide pin for movement along a path adjacent to the periphery of the coil in a direction generally transverse to a normal tape path between the access openings and the coil between a first position providing a first path length between said access openings and said coil and a second position providing a second path length longer than said first path length between said access openings and said coil, and means for biasing said guide pin toward said second position with a low force to provide a low tension in the outermost wrap of the coil about said peripheral surface so that with the tape drive mechanism of a said machine engaged with the minor portion of the tape between the slot and the guide pin, the low tension in the outermost wrap of the coil produces a significantly higher tension in the tape between the innermost wrap of the coil and the drive mechanism that is sufficient to press the tape guided across the openings against the heads in the machine, and said guide pin will move and maintain generally a uniform low tension in the outermost wrap and thus maintain generally a uniform relatively high tension in the tape guided across the heads in response to changes in length in the minor portion of the tape during operation of the cartridge.

2. A cartridge according to claim 1 wherein said means for mounting said guide pin comprises an arm having a first end supporting said guide pin, and a second end pivotably mounted about an axis on said housing to afford movement of said pin between said first and second position in an arcuate path along the periphery of said coil, which arcuate path is located between said coil and at least some of said openings.

3. A cartridge according to claim 2 wherein said means for biasing said guide pin comprises a spring having a central coil about said axis at the second end of said arm, a second end portion fixed to said arm, and an opposite first end portion, and said housing includes an array of lugs about said axis, said first end portion being engaged with one of said lugs and being adapted to engage any other of said lugs to adjust the force applied to the tape by said guide pin.

4. A cartridge according to claim 1 or claim 2 wherein said hub is of a polymeric material having a filler to modify its coefficient of thermal expansion to a predetermined value so that during temperature increases of the cartridge the increase in the length of said tape will be offset by the greater length of the tape in the coil due to the increase in thickness of the tape and the increased diameter of the hub.

5. A cartridge according to claim 1 or claim 2 wherein the radius of said hub decreases slightly around the hub in the direction the coil rotates from one edge of said slot to the other edge of said slot.

6. A cartridge according to claim 1 or claim 2 wherein the periphery of said hub is defined by parallel spaced circumferential ribs.

7. A method for pressing magnetic tape against a head without the use of pressure pads, comprising:
   providing a hub having a generally cylindrical fixed peripheral surface, a central opening, and a slot opening through said peripheral surface and extending axially across the full width of the hub and communicating with its central opening, and an endless length of magnetic tape;
   wrapping a major portion of the tape about the fixed peripheral surface to form a coil while allowing a minor portion of the tape to extend from the innermost wrap of the coil through the slot into the central opening of the hub, and around the side surface of the coil to the outermost wrap of the coil;
   guiding the tape from the slot and in a free path across the head;
   pulling the tape across the head from the innermost wrap of the coil; and
   applying a light generally uniform force to tension the minor portion of the tape as it moves onto the outer wrap of the coil which will cause a relatively high tension in the tape being pulled from the innermost wrap of the coil across the head and press that tape against the head;
   said applying step comprising the steps of guiding the tape around a guide pin mounted for movement in a path adjacent the periphery of the coil, biasing the guide pin in a direction to extend the path length for the minor portion of the tape, and allowing the biased guide pin to move along the path to accommodate changes in length in the minor portion of the tape.

* * * * *